(12) United States Patent
Wechsler (10) Patent No.: US 9,314,004 B2
(45) Date of Patent: Apr. 19, 2016

(54) BIRD AND ANIMAL FEEDER ARRANGEMENT AND ARTICLE HANGING METHOD

(76) Inventor: Lawrence I. Wechsler, Great Neck, NY (US)

(*) Notice: Subject to any disclaimer, the term of this patent is extended or adjusted under 35 U.S.C. 154(b) by 0 days.

(21) Appl. No.: 11/801,688

(22) Filed: May 10, 2007

(65) Prior Publication Data

US 2009/0071408 A1 Mar. 19, 2009

Related U.S. Application Data

(60) Provisional application No. 60/799,500, filed on May 10, 2006, provisional application No. 60/819,225, filed on Jul. 6, 2006.

(51) Int. Cl.
*A01K 39/00* (2006.01)
*A01K 39/012* (2006.01)
*A01K 39/014* (2006.01)

(52) U.S. Cl.
CPC .............. *A01K 39/012* (2013.01); *A01K 39/014* (2013.01)

(58) Field of Classification Search
CPC ....................................................... A01K 39/00
USPC ................. 119/52.2, 464, 429, 430; 248/324, 248/222.5, 220.21; 221/282, 283
See application file for complete search history.

(56) References Cited

U.S. PATENT DOCUMENTS

| | | | | |
|---|---|---|---|---|
| 1,617,988 A | * | 2/1927 | Boyer | 119/77 |
| 2,875,729 A | * | 3/1959 | Gibson | 119/52.2 |
| 4,233,941 A | * | 11/1980 | Webster | 119/52.2 |
| 4,958,595 A | * | 9/1990 | Richman et al. | 119/52.2 |
| 5,183,005 A | * | 2/1993 | Tyler | 119/52.2 |
| 5,823,135 A | * | 10/1998 | Gilchrist et al. | 119/52.2 |
| 6,647,921 B2 | * | 11/2003 | Stokes et al. | 119/52.3 |

* cited by examiner

*Primary Examiner* — Kristen C Hayes (57) ABSTRACT

An apparatus and method allows at least a reservoir portion of a bird feeder to be relieved of its mounted hanging condition and replaced thereto in a facilitated manner. A mounting structure normally remains in an attached state with an elevated support, such as a tree limb, pole or the like, and a bottle or other reservoir for containing feed material (or reservoir assembly, which may optionally also include a feeding station, decorative parts, etc.) is selectively engageable therewith. Advantageously, cooperating structure of the reservoir itself and the mounting structure allow coupling and uncoupling of each. By virtue of this arrangement, when exhausted of feed, a spent reservoir (or the entire reservoir assembly) can be easily removed from its suspended above-ground state, and either refilled and replaced, or more preferably, simply recycled and replaced with a new pre-filled reservoir/reservoir assembly, in the manner of a cartridge.

21 Claims, 8 Drawing Sheets

BIRD AND ANIMAL FEEDER ARRANGEMENT AND ARTICLE HANGING METHOD

CROSS REFERENCE TO RELATED APPLICATIONS

This application claims the benefit of U.S. Provisional Application No. 60/799,500 filed May 10, 2006 entitled BIRD FEEDER HANGING APPARATUS AND METHOD, and U.S. Provisional Application No. 60/819,225 filed Jul. 6, 2006 entitled BIRD FEEDER RESERVOIR ARRANGEMENT AND HANGING METHOD.

BACKGROUND OF THE INVENTION

The present invention relates to a hanger arrangement for articles, such as hanging plant baskets, and which is particularly well adapted to mounting of feeders for birds and other animals (referred to generally hereinafter as "bird feeders," but being understood as applicable to a feeder for any animal), and more particularly to an apparatus and method for facilitating, and making more sanitary, the replacement of feed to an elevated bird feeder once consumed, and a bird feeder incorporating the aforementioned method and apparatus.

A substantial entirety of bird feeders currently on the market are refilled through the open top of some form of feed hopper, which operation further involves removal of a cover or lid which serves to cover the top opening. A refilling operation can be carried out while the feeder remains in a hanging condition, or after the feeder is taken down from the tree limb or other support. In either case, this is invariably a time consuming and relatively difficult task, requiring the use of a ladder and/or necessitating subsequent re-mounting of the entire feeder to the overhead support. In the winter, especially, this can be an unpleasant experience, and one that potentially discourages many from enjoying the pleasurable and rewarding hobby of bird feeding. Cleaning of, particularly, the feeding stations thereof, where the birds actually feed, is also messy and unpleasant, and if proper cleaning practices are not routinely observed by the user, a potential danger to the birds being fed will be present, in the form of harmful mold, etc.

It would therefore be desirable to provide a structure in a bird feeder which would allow facilitated removal of at least a feed containing reservoir, such as a plastic bottle, of a bird feeder, from a mounting structure remaining in a hanging condition to a tree limb or the like, and subsequent replacement of a feed-filled bottle to the mounting structure following feed replenishment or cleaning.

It would be yet more desirable to provide a bottle/feeding station combination which could be easily removed from a suspended state, discarded or recycled after the feed was exhausted, and replaced with a new pre-filled bottle/feeding station combination which could be installed to an elevated mounted and use-oriented position.

Accordingly, it is an object of the invention to provide a method and structure for use with bird feeders which overcomes the drawbacks of the prior art.

It is a further object of the invention to provide a method and structure for use in a bird feeder which readily permits at least a feed retaining portion of the bird feeder to be removed from and replaced to a hanging mounted condition.

It is still a further object of the invention to provide a method and structure, as referred to above, in an economical form allowing reliable and simple operation.

It is a yet further object of the invention to provide a bird feeder which utilizes the method and structure in accordance with the invention.

SUMMARY OF THE INVENTION

In accordance with these and other objects of the invention, there is provided an apparatus and method in accordance with which at least a reservoir-including portion of a bird feeder can be relieved of its mounted hanging condition and replaced thereto in a facilitated manner.

In broad terms, the invention contemplates a structural portion including mounting structure which normally remains in an attached state to an elevated support, such as a tree limb, pole or the like, and to which a bottle or other reservoir for containing feed material (or reservoir assembly, which may optionally also include a feeding station, decorative parts, etc.), is selectively engageable. Advantageously, cooperating structure of the reservoir itself (or alternatively structure carried on any of the other parts making up the reservoir assembly) and the structural portion including the mounting structure, allow coupling and uncoupling of each, preferably in a simplified manner such that the respective operations can easily and readily be carried out with the mounting structure located overhead, and very possibly in a free-swinging state. By virtue of this arrangement, when exhausted of feed, the spent reservoir (or the entire reservoir assembly) can be easily removed from its suspended state, and be either refilled and replaced, or more preferably, simply recycled and replaced with a new pre-filled reservoir/reservoir assembly, in the manner of a cartridge.

Briefly stated, the apparatus according to the invention comprises first and second cooperative portions which can selectively be brought into engagement preventing unassisted separation of one from the other, and out of engagement to permit unencumbered separation, one from the other. The first cooperative portion is carried on a refillable portion of the feeder containing a reservoir, preferably on the bottle itself which contains the feed and which serves as a hopper, and the second cooperative portion is part of a mounting structure affixed, directly or indirectly, to a mounting support (tree, pole, etc.) such that it locates in a position operably accessible by the first portion when held by the user.

Conveniently, the operation of gravity may be utilized to assist in the mutual coupling of the bottle (or bottle assembly) to the mounting structure. In this regard, the second cooperative portion of the mounting structure may include a stop against which a portion of the bottle, configured to achieve such end and which is clearingly received when lifted to a raised position above the stop, shoulders against when lowered by the effects of gravity, thereby preventing further descent of the bottle. With such approach, when separation is desired, the bottle is simply raised above the stop and out of shouldered engagement, and clearingly removed in the same manner in which it was originally installed.

In accordance with a particularly advantageous embodiment, the apparatus according to the invention comprises first and second cooperative portions which can selectively be brought into engagement preventing separation of one from the other, and out of engagement to permit unencumbered separation, one from the other. The first cooperative portion is carried on the refillable portion of the feeder (or other item which is to be dismounted), and the second portion is part of a receiving portion mounted, directly or indirectly, to a mounting support such that it locates in a position operably accessible by the first portion. Either one of the first and second portions includes an opening of suitable non-circular shape (referred to herein as the "female portion"), and the other of the first and second portions includes an engagement portion (referred to herein as the "male portion") has as outer non-circular shape (the same or different from the non-circular shape of the opening) fittable through the opening of the female portion when selectively oriented relative thereto, but which is blocked from passage when oriented in a different relative orientation owing to the non-circular shape of each.

Advantageously, although not necessarily, the engagement portion (i.e., the male portion) of the given one of the first and second portions of the above embodiment has an outer shape corresponding generally to the opening shape in the female portion of the other of the first and second portions, and which is suitably sized for clearance through the opening when the shapes defined by each are mutually aligned. Selective engagement is established by insertion of the male portion in an insertion direction through the female portion a sufficient distance, such that a side of the male portion opposite an insertion side thereof clears an exit side of the female portion adjacent the opening. When the two portions are then rotationally displaced relative to one another such that their corresponding shapes are no longer in mutual alignment (or removed from at least clearance alignment allowing passage), at least a structural part of the male portion shoulders against a respective portion or portions of the structure of the female portion surrounding the opening, thereby preventing removal of the male portion from the female portion in a direction opposite to an insertion direction.

When separation is desired, the two portions (male and female) are rotationally reoriented relative to one another to bring them into mutual alignment (or into at least clearance alignment), thereby relieving any shouldered interference, such that the male portion again clears the opening for easy removal therethrough.

Some examples of the myriad shapes suitable for use in practice of the embodiment of the invention described immediately above (usable in matched pairs or combinations) include, but are not limited to, rectangle, triangle, star, oval, irregular polygon, etc. Other suitable shapes will of course be dictated by particular design constraints of a product utilizing an embodiment of the invention.

In accordance with an advantageous further variation of this embodiment of the invention, the exit side of the female portion and the side opposite to the insertion side of the male portion (area portions of which are brought into contact engagement when the male and female portions are brought into selective engagement by relative rotation), are provided with respective surface configurations which mutually engage circumferentially to inhibit relative rotation when in gravitationally resting contact engagement, such that relative rotation can only be achieved by upward movement of the male portion, against gravity, in the insertion direction to bring them out of contact engagement a sufficient distance to relieve the circumferential engagement therebetween.

In a particularly advantageous further development of the aforementioned embodiment, the above feature is achieved conveniently in the form of radial pleating which defines a series of wedge-shaped or wave-shaped peaks and valleys on each of the engagement surfaces, and which function akin to an axially facing gear arrangement, when two cooperative portions are mutually engaged.

In an embodiment directed to a bird feeder, and which includes a reservoir portion serving as a hopper for feed and a receiving portion mounted to hang from a mounting support structure, such as a tree limb, a portion or portions of the reservoir conveniently comprises the male portion, and the receiving portion, which remains mounted to a tree limb, etc., includes the female portion. Such feature allows facilitated removal and replacement of the reservoir from a mounted remainder of the feeder (i.e., the receiving portion), for simplified replenishment of feed. It is noted that, because of the structural simplicity and versatility of this mounting mechanism, the general principles described herein can be embodied in a plethora of different bird feeder designs, virtually irrespective of reservoir shape and appearance.

In an alternative embodiment, the above described apparatus and method can be used to mount the entire feeder (or any other article or apparatus, including for example, an animal feeder or a hanging plant basket) to support structure, such as the tree limb (or ceiling or overhang).

In accordance with another embodiment of the invention, the mounting structure takes the form of a hanger including bilateral hook-shaped portions spaced apart from one another by a selected distance forming a bottle receiving opening of predetermined width, the hook-shaped portions being interconnected above over a support which is engageable with a tree limb or the like. A generally T-shaped bottle (a base of the bottle being laterally extended in opposed directions) serves as a reservoir for feed and is received to the hanger in an inverted orientation, with a feeding station attached to an opening of the bottle at an end opposite to the base. A width of the bottle (the diameter, if of a circular cross-section) at its vertical extent above the laterally extended base region is dimensioned to fit between the bottle receiving opening of the hanger, to allow the two lateral extensions of the bottle to be cradled by the corresponding hook-shaped portions when lowered onto them. Removal is accomplished simply by lifting the bottle upwards out of the cradled position, and bringing the bottle free of the hanger through the bottle receiving opening.

In another embodiment, illustrative of just one more of the myriad ways of simply configuring an apparatus in accordance with the invention, the mounting structure includes a horseshoe-shaped member, or portion, which is oriented generally horizontally when the mounting structure is mounted to a support structure for use. The bottle (or reservoir) is tapered from the base to the opening such that a diameter of the bottle in a selected position between the bottle opening and base matches the width opening of the horseshoe. Thus, when the bottle is lifted to a position in which a location therealong (closer to the bottle opening) presents a smaller outer diameter than the horseshoe opening adjacent thereto, the bottle can be inserted laterally into the horseshoe through its laterally-facing opening, and then lowered until the bottle diameter exceeds the inner horseshoe width, and which point the bottle seats thereagainst, preventing further downward movement thereof.

As noted above, the invention is particularly well suited for use in a feeder arrangement having a disposable reservoir and/or entire reservoir-feeding station combination, wherein, after the reservoir (serving as a feed hopper) is exhausted of feed, the empty reservoir can be discarded or recycled (optionally, along with the feeding station). In this regard, is contemplated that in accordance with an advantageous embodiment, a pre-filled reservoir containing bird feed, such as seeds, can be provided as a sealed cartridge for use and replacement as necessary. The reservoir in such case is advantageously an inexpensively produced blow-molded bottle of suitable shape for purposes of operably satisfying the mandates of the invention, and is optionally factory-filled with feed and sealed (with foil seal or the like) to retain integrity and freshness until use. Each bottle would advantageously have a feeding station fitted thereto, such that when replacement of an exhausted bottle was required, the user would simply remove the empty bottle/feeding station from mounting to the support and discard/recycle same. The user would then remove the foil cover from the new/filled bottle, attach the new feeding station to the bottle opening, and mount the new bottle to the receiving portion mounted to the support.

Also contemplated is a kit comprising a number (such as, a "six pack") of pre-filled disposable bottles/feeding stations and disposable glove(s) advantageously, although not necessarily, matching in number the bottles in the kit. As such, a user would have, at hand for each replacement/refilling operation, a fresh glove to maintain proper and desired sanitation during a corresponding replacement operation, and which could be discarded/recycled along with the spent feed reservoir.

The above disposable feature assures the health and well-being of the human user and the wild birds attracted to the feeder by maintaining uncompromised cleanliness.

The above, and other objects, features and advantages of the present invention will become apparent from the following description read in conjunction with the accompanying drawings.

BRIEF DESCRIPTION OF THE DRAWINGS

FIG. 5b is a side elevation of the female portion of FIG. 5a;

DETAILED DESCRIPTION OF THE PREFERRED EMBODIMENT

Figures 1, 3A:
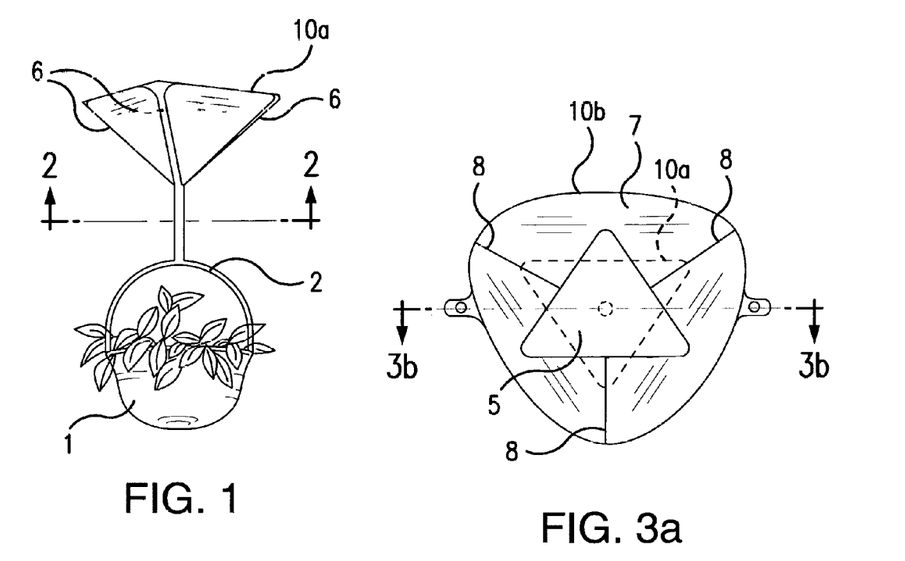
FIG. 1 is a side perspective view of a male portion of an engagement apparatus according to an embodiment of the invention for general use in hanging an object, having a generally triangular cross-sectional shape.
FIG. 3a is a plan view of a female portion of the engagement apparatus according to the invention which is cooperative with the male portion depicted in FIGS. 1 and 2.
Figures 2, 3B:
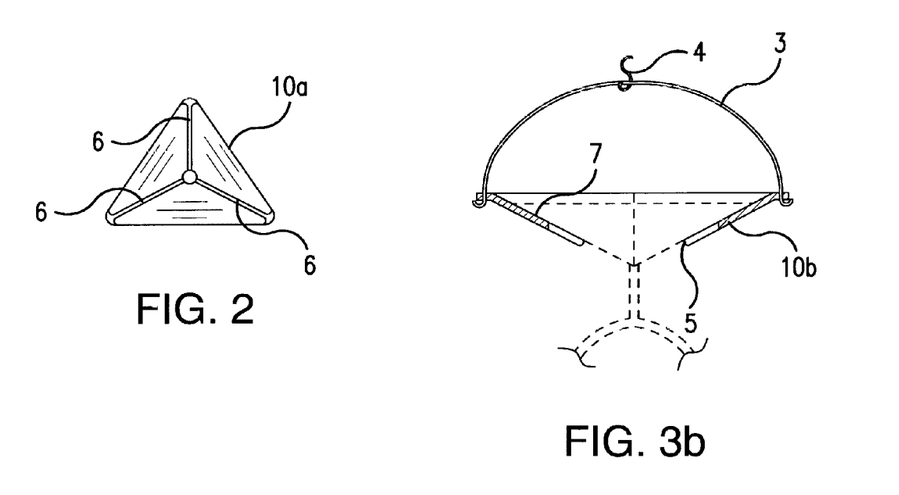
FIG. 2 is a bottom view of the male portion of FIG. 1 taken along lines 2-2.
FIG. 3b cross-sectional view of the female portion of FIG. 3a taken along lines 3b-3b.

Referring now to the figures, and in particular, FIGS. 1-3, an embodiment directed to a hanging apparatus adapted to general use in providing removable hang-mounting capability is depicted. For purposes of description, the embodiment is directed by way of an example incorporating a hanging plant basket as the removable hanging article. The hanging plant 1 is carried, via connecting structure 2, on a male engagement portion 10a (FIGS. 1 and 2). Cooperating mounting structure is provided in the form of a female engagement portion 10b (FIGS. 3a and 3b) which is anchorable, likely in an overhead position, to a support, such as a tree limb or the like (not shown), conveniently via a mounting wire 3 and an S-hook 4.

In the depicted embodiment, a suitable shape for the cooperative engagement structure is conveniently provided as a triangular opening 5 (female) and a corresponding triangular horizontal outer cross-section (male portion 10a), as best seen in the plan views of FIGS. 3a and 2, respectively. Male portion 10a is sized for clearance through the opening 5 in female engagement portion 10b when the two elements are, shape-wise, mutually aligned. Advantageously, male portion 10a is formed generally in the shape of a triangular pyramid (tetrahedron), the three triangular sides of which intersect along three junction lines 6 which define peaked ridges. Female portion 10b is formed having a receiving space 7, also having three junction lines 8 created by the angular intersection of adjacent structural surfaces of female portion 10b, positioned, as shown in FIG. 3a, relative to opening 5.

Mounting of male portion 10a to female portion 10b is accomplished by general alignment of male portion 10a with opening 5, subsequent insertion upwards of male portion 10a through the opening 5 and into the receiving space, and relative rotation (approximately 60°) to bring male portion 10a to the position shown in dotted lines in FIG. 3a. Since the triangular shape of male portion 10a is no longer aligned with opening 5, when male portion 10a is then lowered, male portion 10a shoulders against the surface in the receiving space 7 adjacent to opening 5 on the female portion 10b. While not critical to the invention, the respective junction lines 6 and 8 of male and female portions 10a and 10b advantageously engage one another, inhibiting accidental rotation out of the mounted orientation. To implement dismounting of the male portion 10a from the female portion 10b, male portion 10a is urged upwards to free the circumferential engagement otherwise inhibiting rotation. Male portion 10a is then rotated back into general alignment with opening 5, and lowered therethrough for separation from the female portion 10b.

Turning now to FIGS. 4-7, an embodiment directed to a bird feeder is depicted generally at 20. A bottle 20a (a part thereof serving as a male portion) and a receiving portion 20b (serving at least in part as a female portion) are provided. Bottle 20a has a horizontal cross-sectional shape generally in the form of a cross, advantageously corresponding to a generally matching shape of an opening 25 in receiving portion (female portion) 20b. As an advantageous option, bottle 20a and receiving portion 20b include cooperative circumferential engagement structure for inhibiting rotation when mounted to receiving portion 20b (analogous in function with the previously described embodiment). In this embodiment, circumferential engagement structure is included integrally with the structure of a bottle 20a, provided on a part of the bottle 20a proximate to a bottle opening 21. This structure conveniently takes the form of radial 'pleating' which defines a series of wedge shaped peaks 22 and valleys 23 on the engagement surface of the bottle 20a, and which function akin to a gear arrangement inhibiting relative rotation when mutually engaged with corresponding peaks 26 and valleys 27 provided on receiving portion 20b (see FIG. 5a, wherein bottle 20a is shown in dotted lines oriented in position of engagement).

Figure 5A:
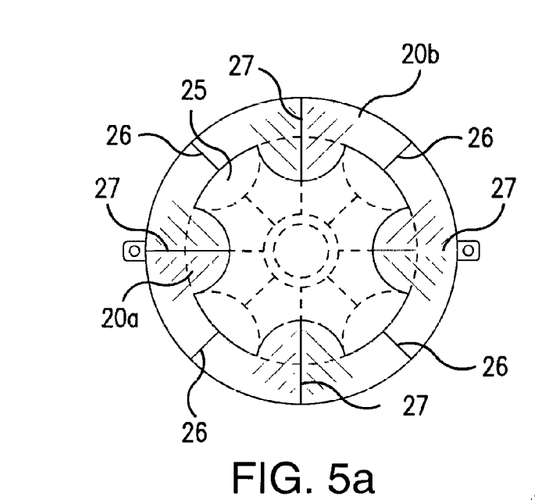
FIG. 5a is a plan view of a female of the engagement apparatus according to the invention which is cooperative with the male portion depicted in FIG. 4.
Figure 5B:
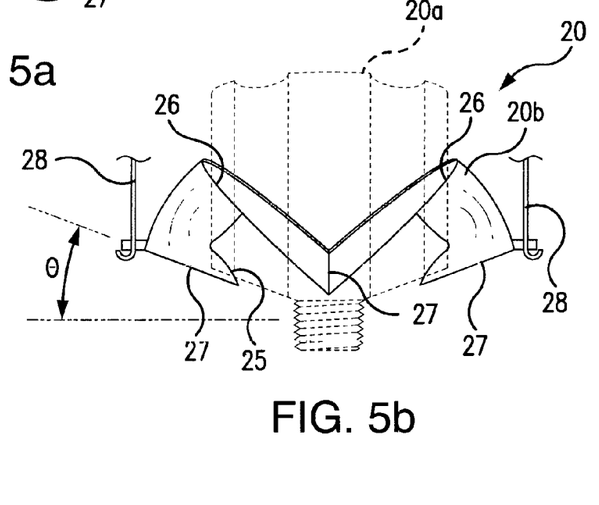
Figure 6:
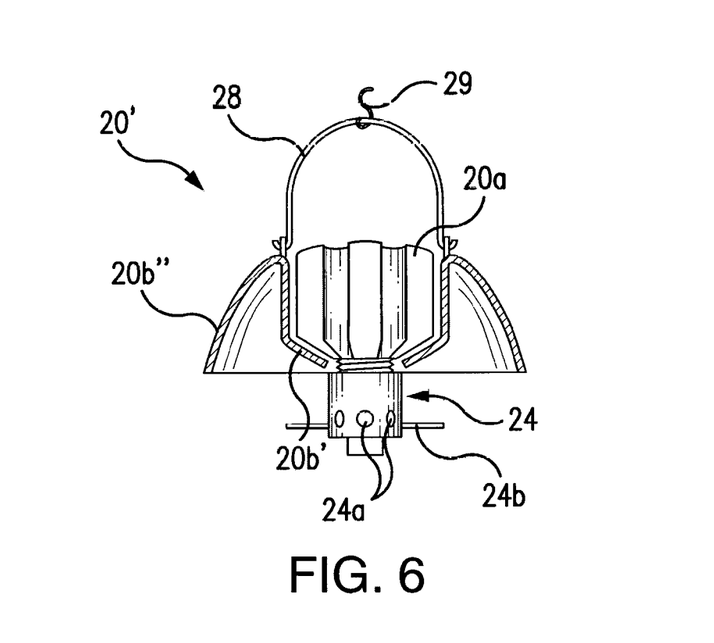
FIG. 6 is a side view in partial cross-section of a bird feeder incorporating the bottle design of FIG. 4.
Figure 7:
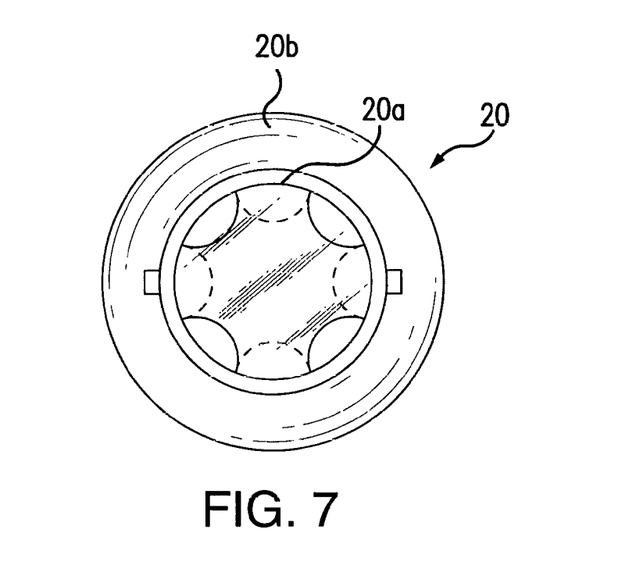
FIG. 7 is a plan view of the embodiment of FIG. 6.

As in the previous embodiment, to accomplish mounting of bottle 20a with receiving portion 20b, bottle 20a is held in an inverted orientation with bottle opening 21 facing downward and is inserted upward through the opening 25 in receiving portion 20b (the latter positioned as shown in FIG. 5b when hanging, for use, from a support (not shown) via a mounting member 28 and S-hook 29, as shown in FIG. 6).

Figure 4:
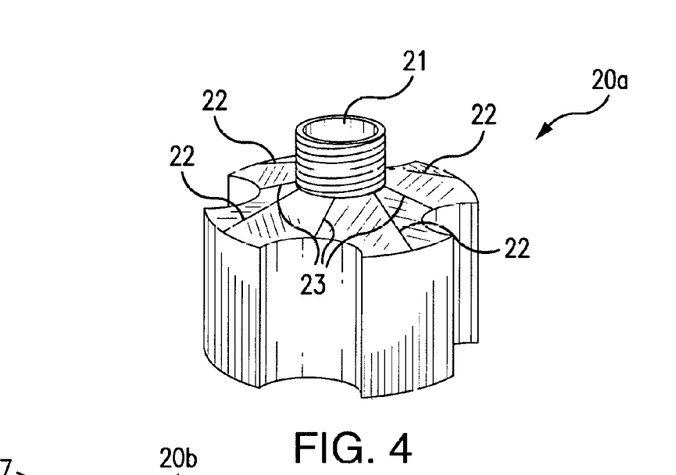
FIG. 4 is a side perspective view of a bottle incorporating the male portion of the engagement apparatus according to another embodiment of the invention having another suitable cross-sectional shape generally resembling a cross and, wherein cooperative parts are positioned proximate to an opening end.

Advantageously, as depicted in FIGS. 4 and 5b respectively, the peaks 22 and valleys 23 of bottle 20a, serving as part of the male portion, and the peaks 26 and valleys 27 formed in receiving portion 20b, serving as part of the female portion, are radially tilted at an angle θ relative to a horizontal plane, such that when rotationally brought to a mounting position, bottle 20a remains naturally centered in opening 25 in receiving portion 20b when resting in shouldered engagement atop receiving portion 20b.

Referring to the assembled depiction in FIG. 6, a bird feeder 20' embodies an advantageous variation of the aforementioned features, and in which a modified receiving portion 20b' includes a skirted outer portion 20b". The overhanging hooded structure provided by skirted outer portion 20b" blocks access to a feeding station 24 from above by rodents (most commonly, squirrels), and serves as a squirrel baffle to discourage unwanted visitation and stealing of feed. Feeding station 24 can be of any suitable conventional design, and includes for example, a series of feed access openings 24a internally communicative with a contents of bottle 20a, and perches 24b on which birds can alight to access feed access openings 24a.

It will be understood that the principles described above can be implemented in a wide array of bird feeder designs without departure from the contemplated invention. For example, while the engagement structure of the bottle 20a in the above described embodiment is carried on the portion thereof proximate to the bottle opening 21, such structure can alternatively be disposed at a portion distant from an opening, proximate instead with a base of a bottle of suitable design, as exemplified below.

Figures 8, 9, 10:
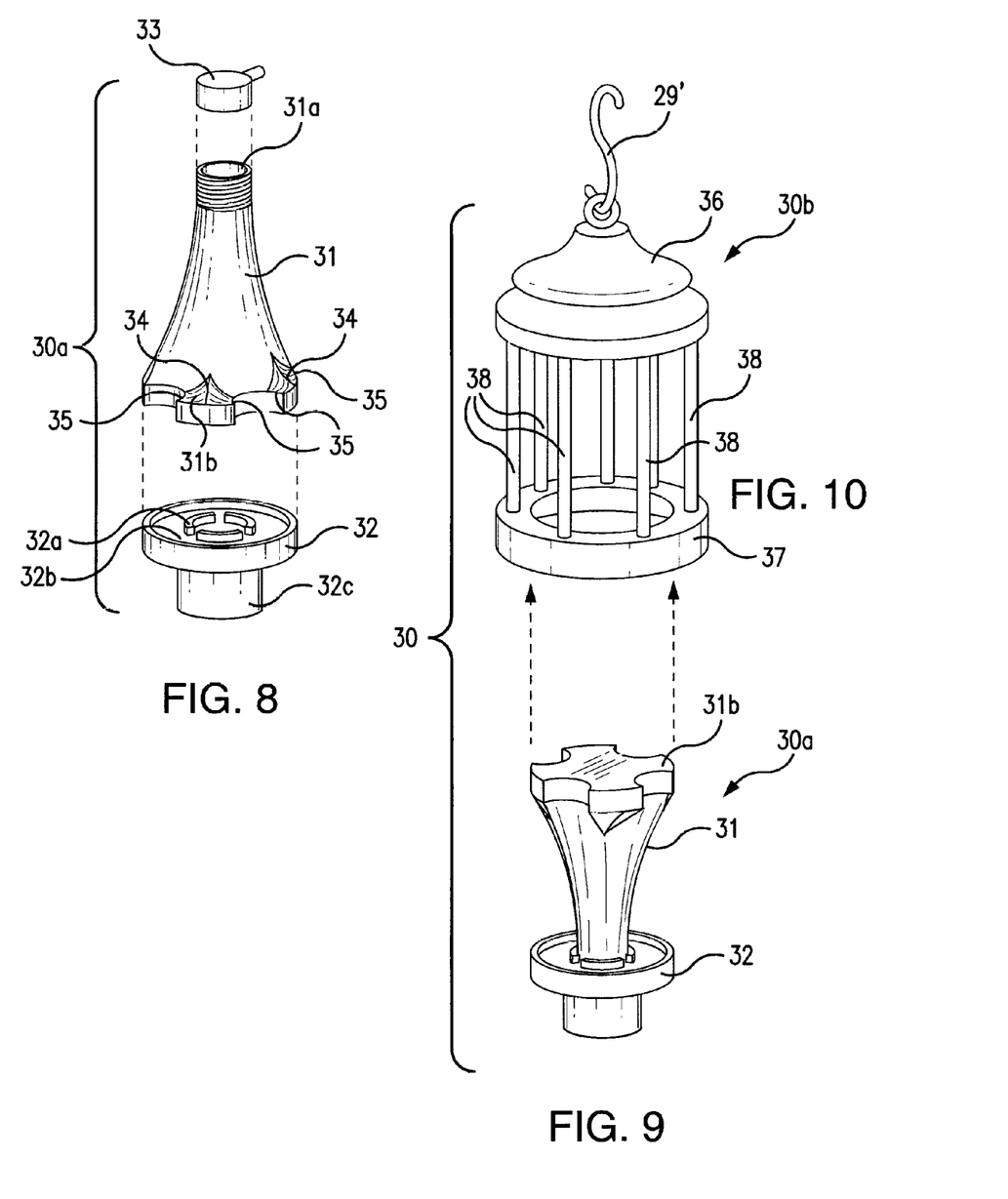
FIG. 8 is an exploded view of a bottle assembly suited, inter alia, to applications where pre-filling of the bottle with feed prior to use and/or disposability of the bottle after use are/is desired, and wherein cooperative parts of the engagement apparatus are positioned at an end distant from the opening end (i.e. a base end)
FIG. 9 is a perspective view of the bottle assembly of FIG. 8, shown in a reassembled form ready for installation to a mounted feeder body.
FIG. 10 is the mounted feeder body adapted for receiving the bottle assembly of FIG. 9.
Figure 11:
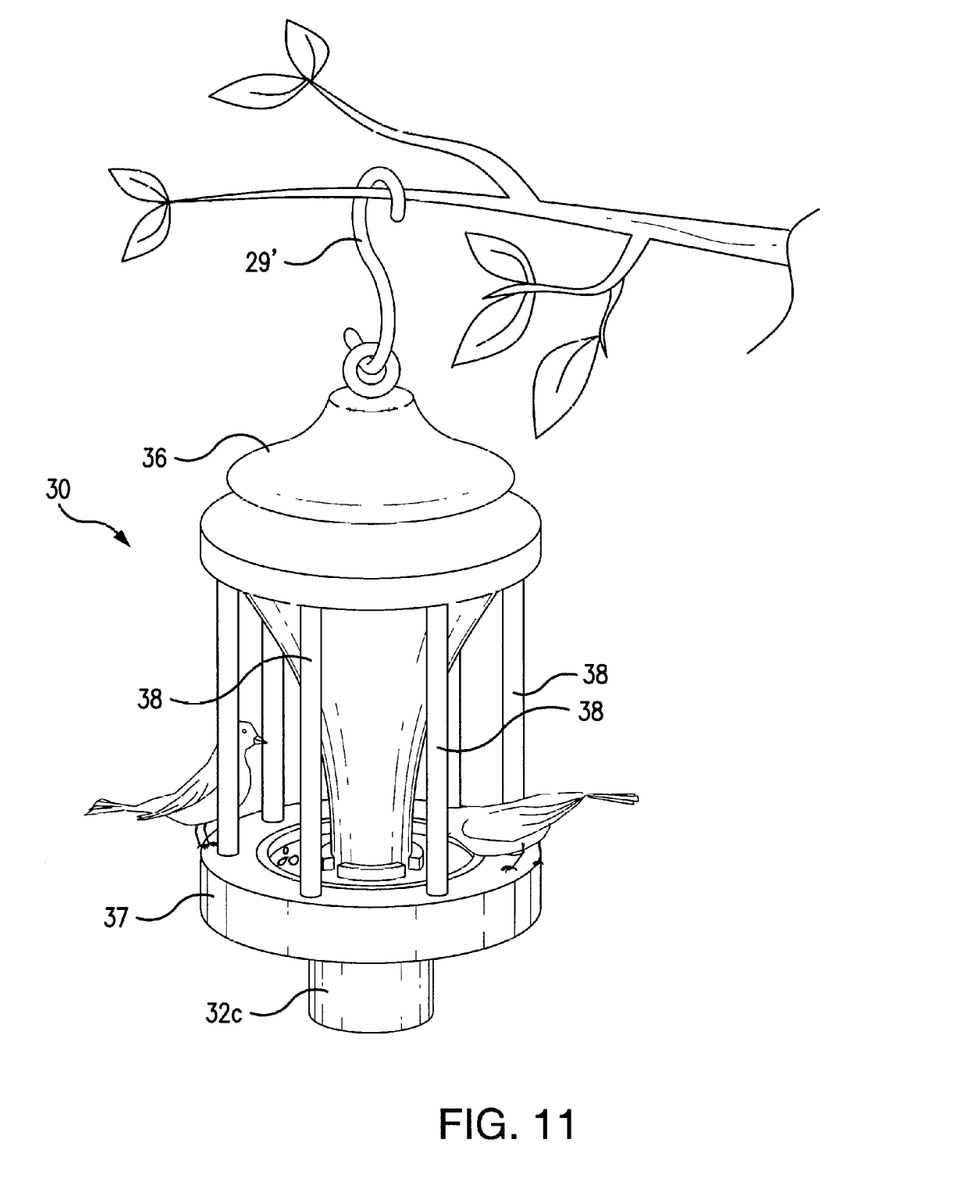
FIG. 11 is a perspective view of the bird feeder including the mounted feeder body of FIG. 10 and the reassembled bottle assembly of FIG. 9.
Figure 12:
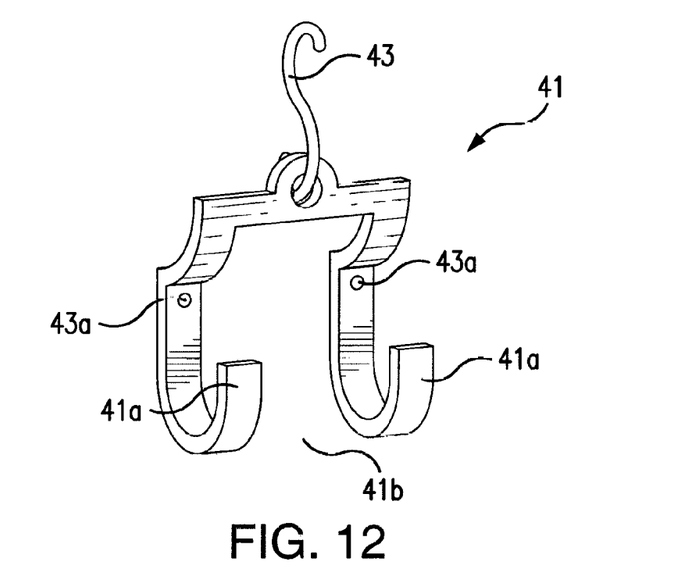
FIG. 12 is a front perspective view of a mounting structure in the form of a hanger having hook-shaped bilateral portions for use as part of a feeding apparatus according to another embodiment of the invention.
Figure 13:
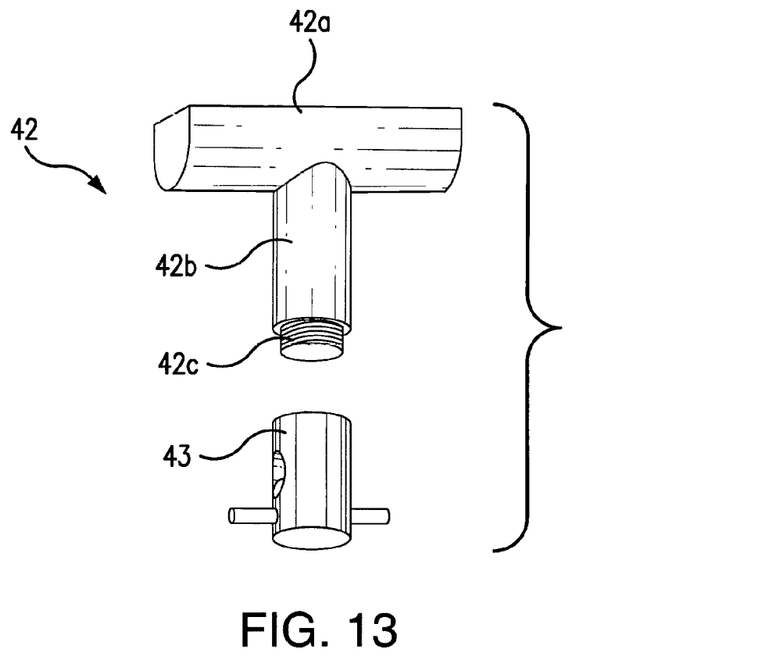
FIG. 13 is an exploded view of a bottle and feeding station for use with the hanger of FIG. 12.
Figures 14, 15:
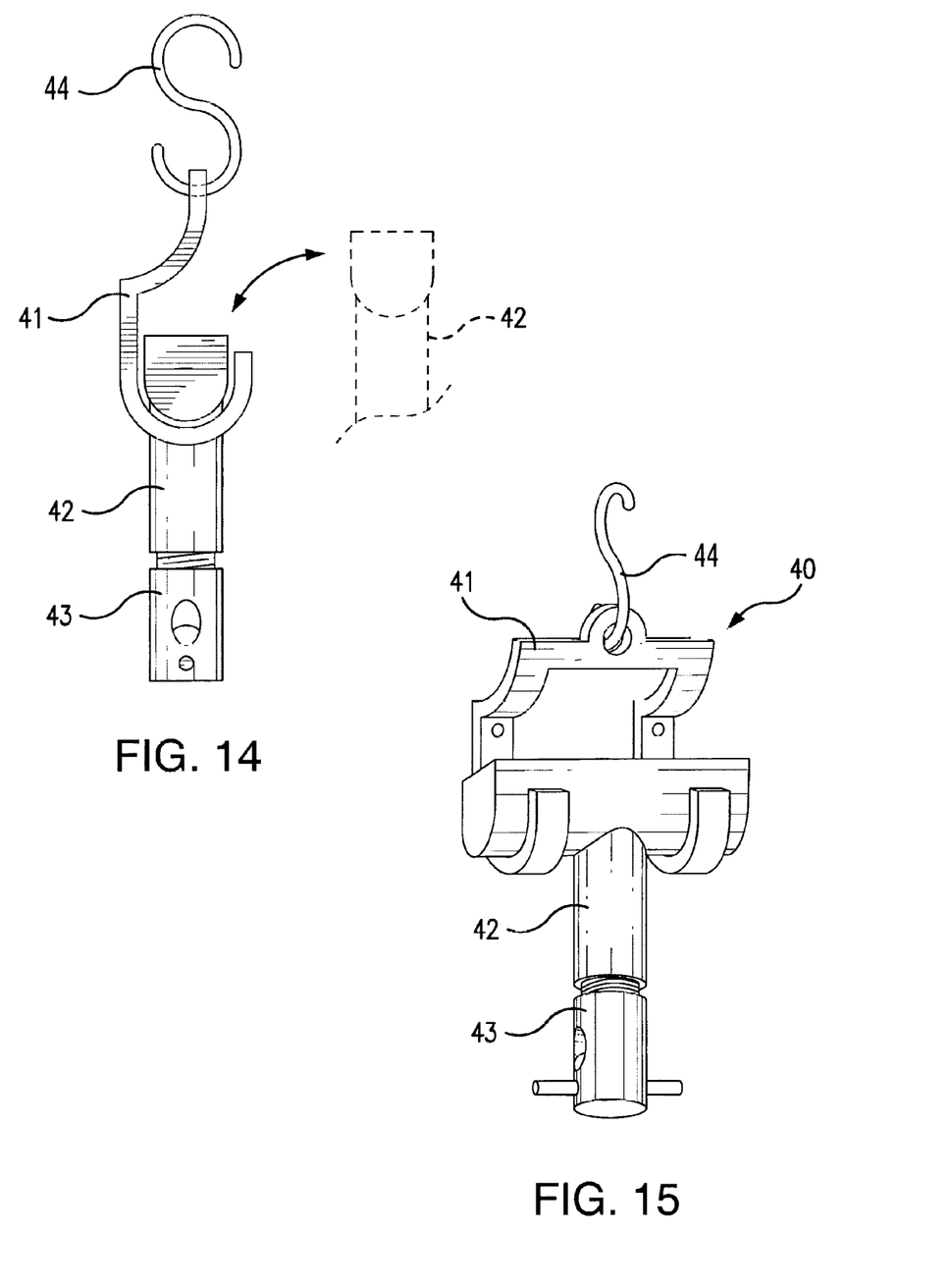
FIG. 14 is a side elevation of the feeding apparatus assembled for use showing the bottle/feeding station assembly of FIG. 13 received to the hanger of FIG. 12.
FIG. 15 is a front perspective view of the feeding apparatus of FIG. 14.

Referring now to FIGS. 8-11, another embodiment of the invention directed to a bird feeder, is depicted generally at 30. As shown in FIGS. 9 and 10, bird feeder 30 includes a receiving portion 30b (a part thereof serving as a female portion which is structured and functions in general accordance with the above described principles) and a replaceable portion 30a (a portion of which functions in turn as a male portion within the constraints of the disclosure herein). Replaceable portion 30a, as shown in FIG. 8, is advantageously depicted in the form of a disposable, pre-filled cartridge bottle assembly for replacement to the receiving portion 30b, as needed, and includes a feed containing reservoir in the form of a suitably shaped bottle 31, a feeding station 32 and a foil cap 33 which sealably closes an advantageously threaded bottle opening 31a to protect the feed contents from exposure to air and spillage. The male portion 31b is provided in the form of a flared base portion of the bottle 31, and includes a series of wedge shaped peaks 34 and valleys 35 which advantageously function akin to the analogous wedge shaped peaks 22 and valleys 23 provided on the engagement surface of the bottle 20a of the prior described embodiment, which were described as mutually engaging with corresponding peaks 26 and valleys 27 provided on receiving portion 20b (as shown in FIG. 5a) in that embodiment. As depicted in FIG. 8, the feeding station 32 is advantageously assembled to the bottle 31 while existing in the form of a feeding cartridge bottle assembly prior to reorienting reassembly in advance of replacement to the receiving portion 30b (as subsequently shown in FIGS. 9 and 10). In this regard, when a feed replacement operation is to be implemented, the bottle assembly comprising the replacement portion 30a of FIG. 8 is reoriented to the condition shown in FIG. 9, wherein the foil cap 33 is removed, and the feeding station 32, originally engaging the flared base (male portion 31b) of the bottle 31 for advantageous packaging compactness, is threadably replaced to the opening 31a of the bottle 31. Feeding station 32 includes a seed tray in which feed transferred from bottle 31 is presented to animals, and a threaded opening portion 32a having cutouts, slots, openings or the like (slots being depicted in the example) suitably placed such that when threadably installed to the bottle opening 31a as shown in FIG. 9, feed contents of the bottle 31 are transferred by gravity to the feed tray portion 32b for consumption by birds or other creatures, as shown in FIG. 11. A handle portion 32c is optionally provided to facilitate installation of the bottle assembly replacement portion 30a into receiving portion 30b, the details of which are described below.

Receiving portion 30b includes a top 36 and an annular base 37 interconnected by a series of circumferentially spaced bars 38. While not depicted in the figures relating to this embodiment, a structure in accordance with that shown at 20b in FIGS. 5a and 5b is provided inside top 36, for engaging the male portion 31b when the replacement portion (bottle assembly is slidably inserted into the opening in annular base 37 and moved upwards, in a manner as described with respect to the prior embodiment. When rotated relative to the top 36 and then lowered, the bottle assembly receiving portion 30 selectively engages the female portion within top 36 and is retained within receiving portion 30b, as shown in FIG. 11. The bars 38 advantageously serve as a barrier to larger birds and squirrels. The feeder 30 is retained to a support, conveniently by an S hook 29' retained to top 36.

Various embodiment of the invention are contemplated as taking a wide variety of shapes and cooperating structural configurations, without departure from the invention. Two examples of possible arrangements are described below.

Referring now to FIGS. 12-15, a feeding apparatus according to a further illustrative embodiment of the invention is shown, generally designated 40. Feeding apparatus 40 includes a mounting structure in the form of a hanger 41 adapted (in the current example) for suspended mounted reception to an overhead support a tree limb or the like, conveniently by means of a hook 44. It will be understood, however, that the mounting structure 41 can take another form, suitable instead for mounting atop a pole or the like. Also, as shown, the hanger 41 can be screwed into, or otherwise fastened to, a wall or other vertical structure, for example, by screws 43a. A reservoir, conveniently in the form of a bottle 42 for containing feed is also provided, shaped specifically (i.e., advantageously, an outer envelope thereof) for engaging the hanger 41, in a manner retaining same in a stable hanging state (shown in FIGS. 14 and 15). Bottle 42 presents a generally T shape, with a base 42a (upper portion, as being shown inverted) thereof being laterally extended in opposed directions such that these portions engage hook-shaped hanger arms 41a of hanger 41 for suspended support. A width of the bottle 42 (i.e., the diameter when of a circular cross-section) at its vertical extent 42b above (or below, in the drawings, as being shown inverted) the laterally extended base region 42a is dimensioned to fit between a bottle receiving opening 41b of the hanger 41, to allow the two lateral extensions of the base 42a of the bottle 42 to be cradled by the corresponding hook-shaped hanger arms 41a when lowered onto them. Removal is accomplished simply by lifting the bottle upwards out of the cradled position, and bringing the bottle 42 free of the hanger 41 through the bottle receiving opening 41b (shown by dotted lines in FIG. 14). For purposes of proper functionality, a feeding station member 43, conveniently of conventional design (alternatively inventive design), is received to the bottle 42 at an opening thereof 42c, advantageously threaded thereto.

Figure 16:
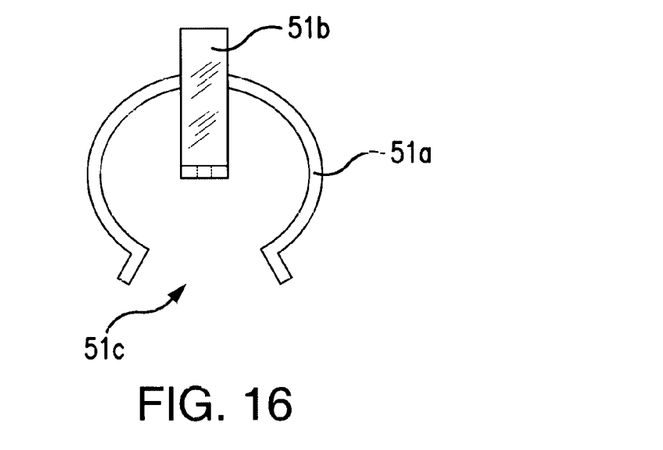
FIG. 16 is a plan view of a mounting structure for use with another feeding apparatus embodiment of the invention in the form including a generally horseshoe-shaped reservoir-receiving portion.
Figure 17:
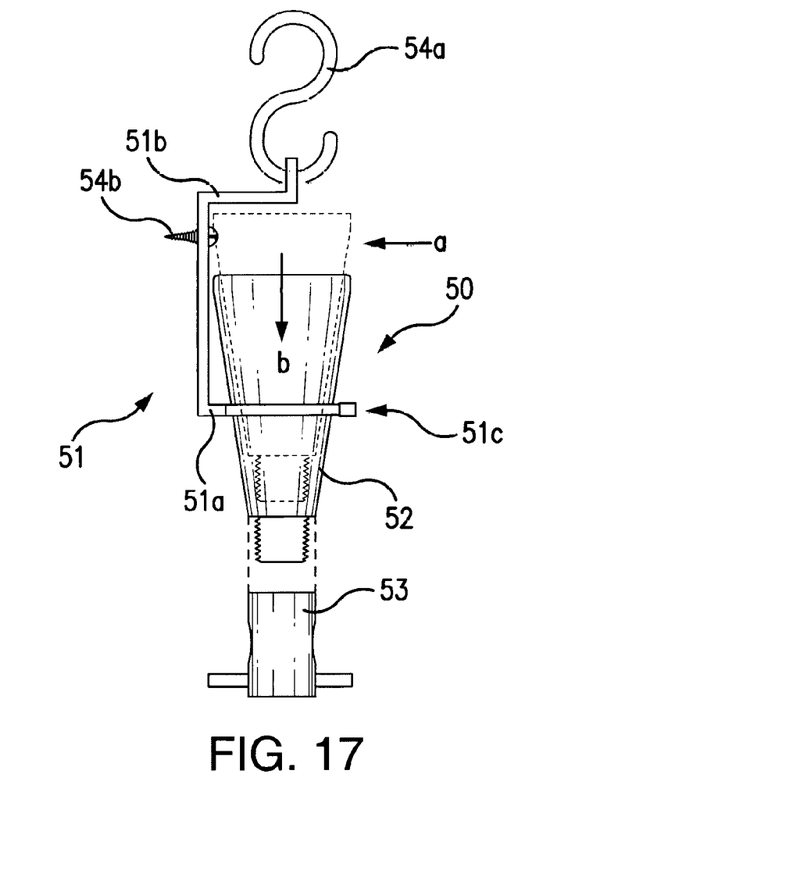
FIG. 17 is a partially exploded side elevation of the feeding apparatus employing the mounting structure of FIG. 16 shown with a tapered bottle and feeding station received thereto.

Turning now to FIGS. 16 and 17, another embodiment of a feeding apparatus is depicted, generally designated 50. Feeding apparatus 50 includes a mounting structure provided in the form of a hanger 51 including a horseshoe-shaped portion 51a and a hanging support 51b extending over and an above the opening in horseshoe-shaped portion 51a. The hanger 51 can be mounted to a support, as in the previous embodiment, by a hook 54a, screws 54b, or other fasteners or the like. A laterally facing opening 51c in horseshoe-shaped portion 51a permits a bottle 52 of suitable configuration, for example, conveniently of conical taper, as shown in FIG. 17, to be inserted laterally from the front (shown by a dotted outline) in a direction of arrow a into horseshoe-shaped portion 51a, and then lowered in a direction of arrow b until it seats against horseshoe-shaped portion 51 as the local diameter of bottle 52 increases to match an interior diameter of horseshoe-shaped portion 51a. The steps for installation are simply reversed to remove bottle 52 when emptied of feed.

It will be apparent that any other structural shape that functions in an analogous manner will be within the contemplated scope of the invention, and that, for example, the bottle need not be conical, but can take a stepped shape, spherical shape received in a matching internal configuration, etc. As shown in FIG. 17, a feeding station 53, for example, of typical design, is fastened (for example, by threads) to bottle 52, such that when inverted and mounted to hanger 51, feed is present for animals (birds) to consume.

Because each of the reservoirs (bottles) 20a, 31, 42 and 52 in the previously described embodiments is inverted to transfer feed contained therein to a feeding station, and is therefore closed at the end facing upwards when inverted for use, each respective structure readily lends itself to production by inexpensive blow molding techniques and materials.

Also, as mentioned above, while the examples are specifically directed to versions in which the bottles themselves serve as a portion of the engagement mechanism cooperative with the mounting structure, it is also deemed to be within the contemplated scope of the invention to instead configure a structural portion or portions carried on, or assembled to, the bottles, for example, the feeding station, such that it, or they, engage the mounting structure to achieve the removable suspended condition of the general type discussed above.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A feeding apparatus, comprising:
a receiving portion attachable to supporting structure and including a female engagement portion having an opening of a non-circular shape and at least one peripheral engagement surface radially outward of said opening; and
a replacement portion removably receivable to said receiving portion, said replacement portion including a reservoir in which feed is containable and at least one feeding station to which the feed is transferable from said reservoir, said replacement portion including a male engagement portion having an outer shape which is suitably shaped and sized for clearance through said opening, in an insertion direction, when respective shapes defined by said opening and said outer shape are rotationally positioned in a first relative orientation, said male engagement portion including at least one male engagement surface, said at least one male engagement surface being contactable with said at least one peripheral engagement surface when said receiving portion and said replacement portion are rotated relative to one another into a second relative orientation, so as to prevent separation of said replacement portion from said receiving portion in a removal direction opposite to said insertion direction, said at least one male engagement surface being liftable from contact with said at least one peripheral engagement surface when said replacement portion is urged in said insertion direction while in said second relative orientation.

2. A feeding apparatus according to claim 1, wherein:
said reservoir includes a first end and a second end spaced apart from said first end, said at least one feeding station being located at or proximate to said first end; and
said male engagement portion is disposed at a position of said reservoir nearer to said second end than to said first end thereof.

3. A feeding apparatus according to claim 1, wherein said male engagement portion is defined at least in part by a configuration of said reservoir.

4. A feeding apparatus according to claim 3, wherein:
said reservoir includes a first end and a second end spaced apart from said first end;
said at least one feeding station is located at or proximate to said first end;
said male engagement portion is disposed at a position of said reservoir nearer to said second end than to said first end thereof.

5. A feeding apparatus according to claim 3, wherein:
said reservoir includes a first end and a second end spaced apart from said first end;
said at least one feeding station is located at or proximate to said first end; and
said male engagement portion is disposed at a position of said reservoir nearer to said first end than to said second end thereof.

6. A feeding apparatus according to claim 1, wherein said male engagement portion includes circumferential engagement structure operable to inhibit movement from said second relative orientation to said first relative orientation.

7. A feeding apparatus according to claim 6, wherein said circumferential engagement structure includes peaks and valleys which engage cooperative structure carried on said female engagement portion.

8. A feeding apparatus according to claim 1, wherein said at least one male engagement surface and said at least one peripheral engagement surface are radially tilted relative to a reference plane so as operate to center said replacement portion with respect to said opening.

9. A feeding apparatus according to claim 1, wherein said receiving portion includes a skirted outer portion presenting an overhanging hooded configuration.

10. A feeding apparatus according to claim 1, wherein:
said receiving portion includes a top portion and a bottom portion;
said top portion includes said female engagement portion;
said bottom portion is disposed at or below said at least one feeding station and includes a reception opening for allowing passage of said replacement portion therethrough;
said top portion and said bottom portion being interconnected by barrier structure defining an internal chamber configured to allow accommodation of said reservoir and said at least one feeding station; and
said barrier structure includes openings sufficiently large to allow a bird to have access to the at least one feeding station, yet sufficiently small to inhibit access to the at least one feeding station by other larger animals.

11. A method of providing feed for an animal, comprising:
providing a reservoir including an opening through which feed contained therein is transferable to at least one feeding station for access thereto by the animal, said reservoir comprising an upper portion and a lower portion, at least one engagement surface being located at a transition region between said upper and lower portions;
mounting a mounting structure to supporting structure, said mounting structure including a hanger portion comprising at least one receiving surface configured to restably support said at least one engagement surface, said hanger portion including structure defining an interior region, said hanger portion further including a receiving opening to said interior region, said receiving opening being of a width sufficient to allow lateral passage of said lower portion of said reservoir while blocking lateral passage of said upper portion;
lifting the reservoir to a sufficient height at which a top of the receiving opening coincides positionally with a portion of the reservoir located below said transition region;
laterally inserting the reservoir into said interior region through said receiving opening; and
lowering the reservoir to bring the at least one engagement surface into resting contact with the at least one receiving surface with said opening of the reservoir being positioned below said at least one receiving surface of said mounting structure.

12. A method according to claim 11, further comprising configuring the reservoir and the mounting structure such that removal of said reservoir from said mounting structure is inhibited in a lateral direction through said receiving opening when said at least one engagement surface of the reservoir is in said resting contact with the at least one receiving surface.

13. An article hanging apparatus, comprising:
a receiving portion attachable to supporting structure; and
a replacement portion removably receivable to said receiving portion, said receiving portion and said replacement portion respectively including first and second cooperative portions, a one of said first or second cooperative portions including a female engagement portion having an opening of a non-circular shape and at least one peripheral engagement surface radially outward of said opening and a remaining one of said first or second cooperative portions including a male engagement portion having an outer shape which is suitably shaped and sized for clearance through said opening, in an insertion direction, when respective shapes defined by said opening and said outer shape are rotationally positioned in a first relative orientation, said opening and said outer shape being positionable in a second relative orientation by relative rotation of said receiving portion and said replacement portion, said male engagement portion including at least one male engagement surface which is contactable with said at least one peripheral engagement surface when said receiving portion and said replacement portion are brought into said second relative orientation by said relative rotation, such that separation of said replacement portion from said receiving portion in a removal direction opposite to said insertion direction is prevented when in said second relative orientation, said at least one male engagement surface being liftable from contact with said at least one peripheral engagement surface when said replacement portion is urged in said insertion direction while in said second relative orientation.

14. A method of facilitating removable hanging of an article, comprising:
mounting a receiving portion to supporting structure;
providing a replacement portion including the article, a one of said receiving portion or said replacement portion including a female engagement portion having an opening of non-circular shape and a remaining one of said receiving portion or said replacement portion including a male engagement portion having an outer shape which is suitably configured for clearance through said opening when respective shapes defined by said opening and said outer shape are rotationally positioned in a first relative orientation;
inserting the male engagement portion, in an insertion direction, through the female engagement portion while in said first relative orientation, such that a side of the male engagement portion opposite an insertion side clears an exit side of the female engagement portion adjacent the opening; and
rotating said replacement portion relative to said receiving portion to take corresponding shapes of said female and male engagement portions thereof out of a clearance positioning in said first relative orientation and to place the corresponding shapes into a second relative orientation in which at least one portion of the male engagement portion engages at least one respective portion of a structure of the female engagement portion surrounding the opening, thereby preventing removal of the male portion from the female portion in a direction opposite to said insertion direction, said at least one male engagement surface being relievable from engagement with said at least one respective portion surrounding the opening in said insertion direction while in said second relative orientation.

15. A method according to claim 14, wherein said replacement portion includes a feed containing and dispensing portion of an animal feeder.

16. A method according to claim 15, wherein said mounting includes orienting said receiving portion such that said replacement portion extends downward of said receiving portion when in a mounted condition in said second relative orientation.

17. A method according to claim 16, wherein:
said replacement portion includes said male engagement portion;
said feed containing and dispensing portion includes at least one feeding station; and
said at least one feeding station is located below said male engagement portion when in said mounted condition.

18. A method according to claim 17, wherein:
said feed containing and dispensing portion includes a reservoir in which feed is containable; and
said male engagement portion is defined at least in part by a configuration of said reservoir.

19. A method according to claim 18, wherein:
said feed containing and dispensing portion further includes at least one feeding station;
said feed containing and dispensing portion further includes a first end and a second end spaced apart from said first end;
said at least one feeding station is located at or proximate to said first end; and
said male engagement portion is present at a position of said feed containing and dispensing portion which is nearer to said second end than to said first end thereof.

20. A feeding apparatus according to claim 18, wherein:
said feed containing and dispensing portion further includes at least one feeding station;
said feed containing and dispensing portion further includes a first end and a second end spaced apart from said first end;
said at least one feeding station is located at or proximate to said first end; and
said male engagement portion is present at a position of said feed containing and dispensing portion which is nearer to said first end than to said second end.

21. A method according to claim 14, wherein said replacement portion includes said male engagement portion.

* * * * *